United States Patent
Xu et al.

(10) Patent No.: US 9,787,532 B2
(45) Date of Patent: Oct. 10, 2017

(54) MODULE, SYSTEM AND METHOD OF SWITCHING MODULES

(71) Applicant: ABB Schweiz AG, Baden (CH)

(72) Inventors: Ye Xu, Hangzhou (CN); Jiaqi Wang, Hangzhou (CN); Guozi Mu, Hangzhou (CN); Dieter Henkel, Hangzhou (CN); Axel Lohbeck, Hangzhou (CN)

(73) Assignee: ABB Schweiz AG (CH)

( * ) Notice: Subject to any disclaimer, the term of this patent is extended or adjusted under 35 U.S.C. 154(b) by 72 days.

(21) Appl. No.: 14/437,648

(22) PCT Filed: Nov. 7, 2012

(86) PCT No.: PCT/CN2012/084231
§ 371 (c)(1),
(2) Date: Apr. 22, 2015

(87) PCT Pub. No.: WO2014/071574
PCT Pub. Date: May 15, 2014

(65) Prior Publication Data
US 2015/0280971 A1    Oct. 1, 2015

(51) Int. Cl.
*H04J 1/16* (2006.01)
*H04L 12/24* (2006.01)
(Continued)

(52) U.S. Cl.
CPC ...... *H04L 41/0668* (2013.01); *H04L 12/6418* (2013.01); *H04L 41/0659* (2013.01);
(Continued)

(58) Field of Classification Search
CPC .............. H04L 12/6418; H04L 41/0659; H04L 41/0668; H04L 67/12; H04L 69/14; H04L 69/40; H04L 1/22
See application file for complete search history.

(56) References Cited

U.S. PATENT DOCUMENTS

2004/0076428 A1    4/2004  Green et al.
2007/0115806 A1*   5/2007  Onorato ............ H04L 29/06027
                                                     370/219
(Continued)

FOREIGN PATENT DOCUMENTS

CN    1874396 A    12/2006
EP    0416943 A2    3/1991

OTHER PUBLICATIONS

ISA/CN International Search Report issued Aug. 15, 2013 re PCT Application No. PCT/CN2012/084231, filed Nov. 7, 2012.
(Continued)

*Primary Examiner* — Kan Yuen
(74) *Attorney, Agent, or Firm* — Taft Stettinius & Hollister LLP (57) ABSTRACT

A module has switchable operation states. A first switching unit switches the module between a first operation state and a second operation state. A first interface switches between sending signals to another module which has switchable operation states and receiving signals from the other module. The first interface sends a first signal to the other module when the module is in the first operation state, sends a second signal to the other module when the module is to be switched into the second operation state, and receives signals from the other module when the module is in the second operation state. A second interface communicates with the other module. When the second interface receives a response of the other module to the second signal, the first switching unit switches the module into the second operation state. The reliability of module switching is improved in an embodiment.

6 Claims, 4 Drawing Sheets

(51) Int. Cl.
H04L 12/64 (2006.01)
H04L 29/08 (2006.01)
H04L 29/14 (2006.01)
H04L 29/06 (2006.01)

(52) U.S. Cl.
CPC ............. *H04L 67/12* (2013.01); *H04L 69/14* (2013.01); *H04L 69/40* (2013.01)

(56) References Cited

U.S. PATENT DOCUMENTS

| | | |
|---|---|---|
| 2007/0117431 A1 | 5/2007 | Yen et al. |
| 2007/0133398 A1* | 6/2007 | Zhai ..................... H04L 45/00 370/228 |
| 2007/0202826 A1 | 8/2007 | Dean |

OTHER PUBLICATIONS

Supplementary European Search Report issued Jun. 2, 2016 re Application No. EP12887971 of ABB Technology Ltd.
The State Intellectual Property Office of the P.R. China, First Office Action in corresponding application 201280076701.2, dated Jun. 22, 2017, 9 pages, including english language translation.

* cited by examiner

MODULE, SYSTEM AND METHOD OF SWITCHING MODULES

FIELD OF THE INVENTION

The present disclosure generally relates to process control, particularly relates to a module, a system and a method of module switching, and more particularly relates to a module which has switchable operation states, a system including two of such modules, and a method for switching two of such modules.

BACKGROUND OF THE INVENTION

Recently, redundancy is widely used in the process control area. The redundancy provides two modules, one of which is an active module and the other of which is a passive module, that is, a backup module. The two modules run the same software, while in the case of normal operation, only one module operates as the active module, and the other module operates as the backup module. When the active module detects a fault, a switch (fail-over) will be started, such that the original active module operates as the backup module, and the original backup module operates as the active module.

In prior art, above switching is achieved by a redundancy line and a communication line. However, by such prior art, it is impossible to determine whether there is any fault in the redundancy line and communication line, which may cause the switching cannot be performed. In process control, such situation may cause losing field control and thus is very dangerous in some scenes.

SUMMARY OF THE INVENTION

The present disclosure aims to provide a module, a system and a method of module switching which improves the reliability of switching. Preferably, according to the embodiments of the present disclosure, at least one of following effects may be achieved:

the bump in the output of the modules caused by the switching is relatively small;
the modules may provide continuous and valid input and/or output; and
the modules may monitor the redundant functionality.

Particularly, according to an embodiment of the present disclosure, it is provided a module which has switchable operation states, including: a first switching unit, configured to switch the module between a first operation state and a second operation state; a first interface, configured to be switched between sending signals to another module which has switchable operation states and receiving signals from the other module, wherein the first interface sends a first signal to the other module when the module is in the first operation state, sends a second signal to the other module when the module is to be switched into the second operation state, and receives signals from the other module when the module is in the second operation state; and a second interface, configured to communicate with the other module. When the second interface receives, from the other module, a response to the second signal sent by the first interface, the first switching unit switches the module into the second operation state.

According to another embodiment of the present disclosure, it is also provided a module which has switchable operation states, including: a second switching unit, configured to switch the module between a third operation state and a fourth operation state; a third interface, configured to be switched between sending signals to another module which has switchable operation states and receiving signals from the other module, wherein the third interface receives signals from the other module when the module is in the third operation state, and sends signals to the other module when the module is in the fourth operation state; and a fourth interface, configured to communicate with the other module. The module is maintained in the third operation state when the third interface receives a first signal from the other module. The fourth interface sends a response to the other module, the second switching unit switches the module into the fourth operation state, and the third interface sends the first signal to the other module, when the third interface receives a second signal from the other module.

According to yet another embodiment of the present disclosure, it is further provided a system comprising a first module and a second module which have switchable operation states. The first module includes: a first switching unit, configured to switch the first module between a first operation state and a second operation state; a first interface, configured to be switched between sending signals to the second module and receiving signals from the second module, wherein the first interface sends a first signal to the second module when the first module is in the first operation state, sends a second signal to the second module when the first module is to be switched into the second operation state, and receives signals from the second module when the first module is in the second operation state; and a second interface, configured to communicate with the second module. When the second interface receives, from the second module, a response to the second signal sent by the first interface, the first switching unit switches the first module into the second operation state. The second module includes: a second switching unit, configured to switch the second module between a third operation state and a fourth operation state; a third interface, configured to be switched between sending signals to the first module and receiving signals from the first module, wherein the third interface receives signals from the first module when the second module is in the third operation state, and sends signals to the first module when the second module is in the fourth operation state; and a fourth interface, configured to communicate with the first module. The second module is maintained in the third operation state when the third interface receives the first signal from the first module. The fourth interface sends the response to the first module, the second switching unit switches the second module into the fourth operation state, and the third interface sends the first signal to the first module, when the third interface receives a second signal from the first module.

According to yet another embodiment of the present disclosure, it is further provided a method of switching a first module and a second module which have switchable operation states, including: sending, by the first module, a first signal to the second module via a first interface of the first module when the first module is in a first operation state; sending, by the first module, a second signal to the second module via the first interface when the first module is to be switched into a second operation state; maintaining the second module in a third operation state when the second module receives the first signal from the first module via a third interface of the second module; sending, by the second module, a response to the first module via a fourth interface of the second module, switching the third interface to send the first signal to the first module, and switching the second module into a fourth operation state, when the second module receives the second signal from the first module via the third interface; and switching the first interface to receive signals from the second module and switching the first module into the second operation state when the first module receives the response via a second interface of the first module.

By the module, system and method of module switching according to embodiments of the present disclosure, the reliability in module switching is improved.

DETAILED DESCRIPTION OF THE EMBODIMENTS

Hereinafter, above and other features and advantages of the present disclosure will become apparent by describing the embodiments of the present disclosure in combination with the drawings.

According to an embodiment of the present disclosure, it is provided a first module which has switchable operation states, including: a first switching unit, configured to switch the first module between a first operation state and a second operation state; a first interface, configured to be switched between sending signals to a second module which has switchable operation states and receiving signals from the second module, wherein the first interface sends a first signal to the second module when the first module is in the first operation state, sends a second signal to the second module when the first module is to be switched into the second operation state, and receives signals from the second module when the first module is in the second operation state; and a second interface, configured to communicate with the second module. When the second interface receives, from the second module, a response to the second signal sent by the first interface, the first switching unit switches the first module into the second operation state.

According to another embodiment of the present disclosure, it is also provided a second module which has switchable operation states, including: a second switching unit, configured to switch the second module between a third operation state and a fourth operation state; a third interface, configured to be switched between sending signals to the first module and receiving signals from the first module, wherein the third interface receives signals from the first module when the second module is in the third operation state, and sends signals to the first module when the second module is in the fourth operation state; and a fourth interface, configured to communicate with the first module. The second module is maintained in the third operation state when the third interface receives a first signal from the first module. The fourth interface sends a response to the first module, the second switching unit switches the second module into the fourth operation state, and the third interface sends the first signal to the first module, when the third interface receives a second signal from the first module.

According to yet another embodiment of the present disclosure, it is also provided a system including a first module and a second module, which may be configured as stated above.

Figure 1:
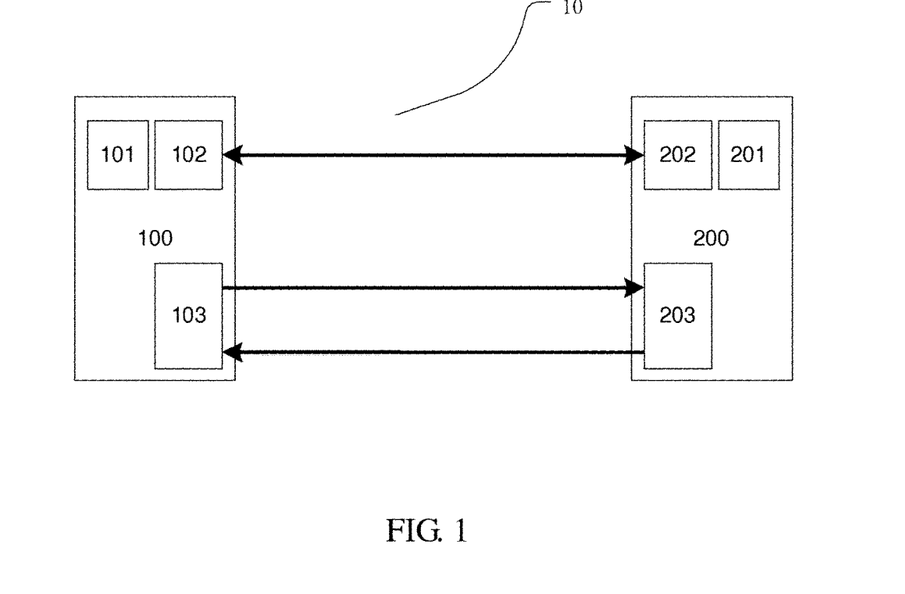
FIG. 1 is an illustrative diagram showing a system according to an embodiment of the present disclosure.

FIG. 1 shows a system 10 as an example of the embodiment according to the present disclosure. The system 10 includes a first module 100 as an example of the first module according to the embodiment of the present disclosure, and also includes a second module 200 as an example of the second module according the embodiment of the present disclosure.

Preferably, the system 10 is a process control system. However, the system 10 is not limited thereto, and may also be other system. Furthermore, the first module 100 and the second module 200 may be modules with at least one of the following functions: measuring field data and controlling field device.

Particularly, FIG. 1 shows the structures of the first module 100 and the second module 200. The first module 100 and the second module 200 may be backup modules of each other. The first operation state of the first module may be a normal operation state and the second operation state of the first module may be a backup state, and the third operation state of the second module may be a backup state and the fourth operation state of the second module may be a normal operation state. However, the first module 100 and the second module 200 are not limited thereto. For example, the first operation state of the first module 100 may be an input state for collecting measuring values while the second operation state of the first module 100 may be an output state for controlling, and the third operation state of the second module 200 may be the output state while the fourth operation state of the second module 200 may be the input state. In a possible scene, when the first module 100 is in the input state, the second module 200 is in the output state, and when the first module 100 is in the output state, the second module 200 is in the input state.

The first module 100 includes a first switching unit 101, a first interface 102 and a second interface 103.

The first switching unit 101 switches the first module 100 between the normal operation state and the backup state. For example, the first switching unit 101 may switch the first module 100 from the normal operation state into the backup state when a fault occurring in the first module 100 is detected, and may also perform the switching in other cases according to a predetermined control strategy.

The first interface 102 is switched between sending a first signal or second signal to the second module 200 and receiving the first signal or second signal from the second module 200.

When the first module 100 is in the normal operation state, the first interface 102 sends the first signal to the second module 200. When the first module 100 is to be switched into the backup state, the first interface 102 sends the second signal to the second module 200. When the first module 100 is in the backup state, the first interface 102 receives signals from the second module 200.

The second interface 103 communicates with the second module 200.

When the second interface 103 receives the response of the second module 200 to the second signal, the first switching unit 101 switches the first module 100 into the backup state.

Preferably, after the first interface 102 sends the second signal to the second module 200, if the second interface 103 fails to receive the response within a predetermined period, the first module 100 issues error information. For example, the first module 100 may send the error information to the operator, or send the error information in other proper manner, in order to indicate that there is a fault in the communication lines between the first module 100 and the second module 200, that is, there is a fault between the first interface 102 and a third interface 202 of the second module 200 which will be described later and/or between the second interface 103 and the fourth interface 203 of the second module 200 which will be described later.

The first module 100 may determine whether there is any fault in the communication lines between the first module 100 and the second module 200 based on the response from the second module 200, by other proper manner.

The second module includes a second switching unit 201, the third interface 202 and the fourth interface 203.

The second switching unit 201 switches the second module 200 between the backup state and the normal operation state. For example, the second switching unit 201 may switch the first module 200 from the backup state into the normal operation state when a fault occurring in the first module 100 is detected, and may also perform the switching in other cases according to a predetermined control strategy.

The third interface 202 is switched between sending signals to the first module 100 and receiving signals from the first module 100.

When the second module 200 is in the backup state, the third interface 202 receives the first signal or second signal from the first module 100. When the second module 200 is in the normal operation state, the third interface 202 sends the first signal or second signal to the first module 100.

Preferably, the first interface 102 and the third interface 202 are connected by a "hard wire" of single cable, and the first signal is of high level while the second signal is of low level. However, the first interface 102 and the third interface 202 may be connected by other proper way, for example, connected in wireless manner, and thus the first signal and second signal may also be defined correspondingly.

The fourth interface communicates with the first module 100.

Preferably, the second interface 103 and the fourth interface 203 are Serial Communication Interfaces (SCIs). However, the second interface 103 and the fourth interface 203 may also be other types of interfaces, for example, interfaces for Concurrent Communication.

When the third interface 202 receives the first signal from the first module 100, the second module 200 is maintained in the backup state. When the third interface 202 receives the second signal from the first module 100, the fourth interface 203 sends a response to the first module 100, the second switching unit 201 switches the second module 200 into the normal operation state, and the third interface 202 sends the first signal to the first module 100.

Preferably, the first module 100 sends acknowledge information to the fourth interface 203 of the second module 200 after receiving the response. After the fourth interface sends the response to the first module 100, if the fourth interface 203 fails to receive the acknowledge information from the first module 100 within a predetermined period, the second module 200 issues error information. For example, the second module 200 may send the error information to the operator, or send the error information in other proper manner, in order to indicate that there is a fault in the communication lines between the first module 100 and the second module 200.

The second module 200 may determine whether there is any fault in the communication lines between the first module 100 and the second module 200 based on the acknowledge information from the first module 100, by other proper manner. Besides, without the first module 100 sending any acknowledge information, whether there is any fault in the communication lines between the first module 100 and the second module 200 can be determined by the first module based on the response from the second module.

Although the first module 100 and the second module 200 operate together as constituents of the system 10 as shown in FIG. 1, the first module 100 and the second module 200 are not limited thereto. For example, the first module 100 may cooperate with any proper module, as long as the switching of the first module 100 from the normal operation state into the backup state according to the embodiment of the present disclosure can be achieved. The second module 200 may also cooperate with any proper module, as long as the switching of the second module 200 from the backup state into the normal operation state according to the embodiment of the present disclosure can be achieved. That is, the first module 100 and the second module 200 with the functions shown in the embodiment of FIG. 1 respectively form the protected subject of the present invention.

By the system 10, the first module 100 and the second module 200 according to the embodiments of the present disclosure, it can be determined whether there is a fault in the communication lines between the modules, and thus the reliability in the switching is improved. Particularly, in process control, at least one of following effects may be achieved by performing switching of modules, which are backup modules for each other and used for controlling field devices and/or detecting field data, in a high reliable way:
  the bump in the output of the modules caused by the switching is relatively small;
  the modules may provide continuous and valid input or output; and
  the modules may monitor the redundant functionality.

According to an embodiment of the present disclosure, it is further provided a method of switching a first module and a second module which have switchable operation states, including: sending, by the first module, a first signal to the second module via a first interface of the first module when the first module is in a first operation state; sending, by the first module, a second signal to the second module via the first interface when the first module is to be switched into a second operation state; maintaining the second module in a third operation state when the second module receives the first signal from the first module via a third interface of the second module; sending, by the second module, a response to the first module via a fourth interface of the second module, switching the third interface to send the first signal to the first module, and switching the second module into a fourth operation state, when the second module receives the second signal from the first module via the third interface; and switching the first interface to receive signals from the second module and switching the first module into the second operation state when the first module receives the response via a second interface of the first module.

Hereinafter, an example of the method according to the embodiment of the present disclosure will be described in combination with FIG. 2.

Figure 2:
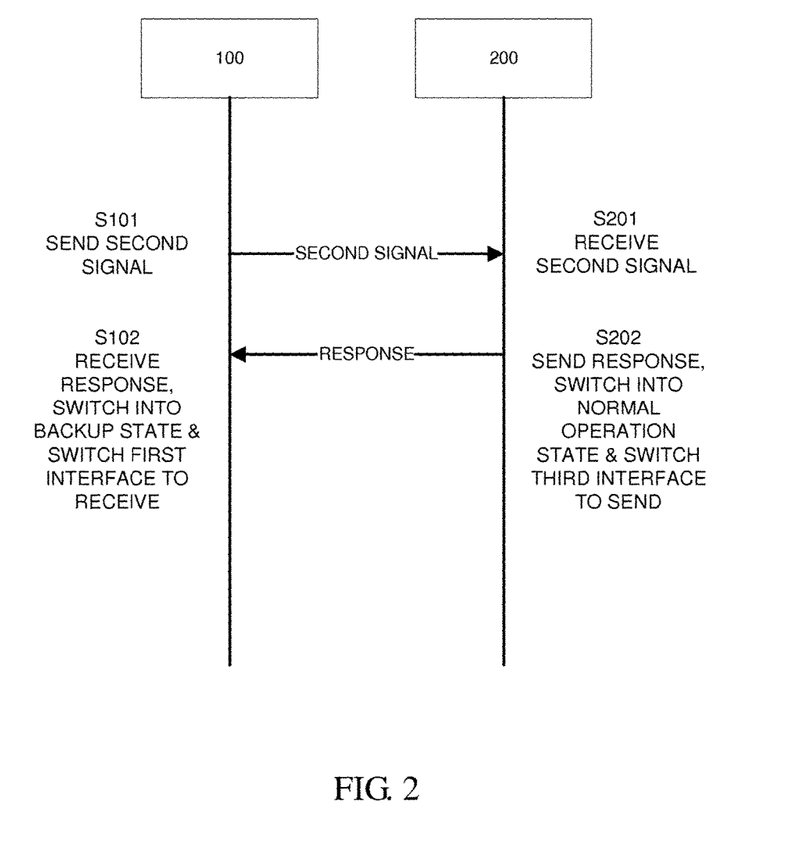
FIG. 2 is an illustrative diagram showing a method of module switching according to an embodiment of the present disclosure.

FIG. 2 shows the processing of switching the first module 100 from the first operation state into the second operation state while switching the second module 200 from the third operation state into the fourth operation state.

As stated above, the first operation state of the first module 100 may be a normal operation state and the second operation state of the first module 100 may be a backup state, and the third operation state of the second module 200 may be a backup state and the fourth operation state of the second module 200 may be a normal operation state.

Before Step S101, the first module 100 is in the normal operation state, and thus sends the first signal to the second module 200 via the first interface 102.

At Step S101, the first module 100 is to be switched into the backup state, and thus sends the second signal to the second module 200 via the first interface 102.

At Step S201, the second module 200 receives the second signal via the third interface 202, and the processing proceeds to the Step S202.

At Step S202, the second module 200 sends a response to the first module 100 via the fourth interface 203, the second module 200 is switched into the normal operation state, and the third interface 202 is switched to send the first signal to the first module 100.

Based on thus method, the first module 100 may determine whether there is any fault in the communication lines between the first module 100 and the second module 200 based on the response from the second module 200.

For example, after the first module 100 sends the second signal to the second module 200, if the first module 100 fails to receive the response from the second module 200 within a predetermined period, the first module 100 issues error information in order to indicate that there is a fault in the communications lines between the first module 100 and the second module 200. As mentioned above, the first module 100 may send the error information in any proper way.

Furthermore, after the first module 100 receives the response, the first module 100 may send acknowledge information to the second module 200. After the second module 200 sends the response to the first module 100, if the second module 200 fails to receive the acknowledge information from the first module 100 within a predetermined period, the second module 200 issues error information in order to indicate that there is a fault in the communications lines between the first module 100 and the second module 200. As mentioned above, the second module 200 may send the error information in any proper way.

The second module 200 may determine, in any proper way, whether there is any fault in the communication lines between the first module 100 and the second module 200 based on the acknowledge information from the first module 100.

Besides, the predetermined period with respect to the acknowledge information mentioned herein may be the same as or be different from the predetermined period with respect to the response mentioned above, so are the relationships between other predetermined periods mentioned hereinafter. That is, in the embodiments of the present disclosure, the predetermined periods with respect to different information may be the same, or may be different from each other.

By the switching method according to the embodiment of the present disclosure, whether there is any fault in the communication lines between the modules may be determined, and thus the reliability in switching can be improved. Thus method is particularly applicable to process control for performing switching of modules, which are backup modules for each other and used for controlling field devices and/or detecting field parameters, and thereby at least one of following effects may be achieved:

the bump in the output of the modules caused by the switching is relatively small;

the modules may provide continuous and valid input or output; and the modules may monitor the redundant functionality.

Besides, the method shown in FIG. 2 may include a one-direction interface detecting step in which whether the first signal and the second signal are able to be sent to the third interface 202 from the first interface 102 is detected.

Hereinafter, an example of the one-direction interface detecting step will be described in combination with FIG. 3. Such step may be periodically performed when the first module 100 is in the normal operation state and the second module 200 is in the backup state, and may also be performed according to the operator's instruction or at other proper timing.

At Step S1101, the first module 100 sends a one-direction detecting request to the second module 200 via the second interface 103.

At Step S1201, the second module 200 receives the one-direction detecting request via the fourth interface 203, and sends a response to the first module 100 via the fourth interface 203. Such response may be the same as or be different from the response in the switching method mentioned above, so are the relationships between other responses mentioned hereinafter. That is, in the embodiments of the present disclosure, the responses with respect to different information may be the same, or may be different from each other. At Step S1201, the second module 200 may disable the switching of operation states on receiving the second signal via the third interface 202.

At Step S1102, if the first module 100 receives the response via the second interface 103 within a predetermined period since the sending of the one-direction detecting request, the first module 100 sends the second signal to the second module 200 via the first interface 102. For example, the first module 100 may send the second signal to the second module 200 for 1 ms, or send the second signal to the second module 200 until Step S1103 or until the detecting step is terminated. Else, the first module 100 issues error information in order to indicate that there is a fault in the communication lines, for example, there is a fault in the communication lines between the second interface 103 and the fourth interface 203. At this time, the first module 100 may further perform proper processing, for example, terminating the one-direction interface detecting step and report to the operator.

At Step S1202, if the second module 200 receives the second signal via the third interface 202 within a predetermined period since the sending of the response, the second module 200 sends acknowledge information to the first module 100 via the fourth interface 203. Else, the second module 200 issues error information, in order to indicate that there is a fault in the communication lines, for example, there is a fault in the communication lines between the second interface 103 and the fourth interface 203 or the signal sent by the first interface 102 is unable to be turned to the second signal from the first signal. At this time, the second module 200 may further performing the proper processing as mentioned above. Furthermore, the second module 200 may send the error information to the first module 100 via the fourth interface 203.

Such acknowledge information may be the same as or be different from the acknowledge information in the switching method mentioned above, so are the relationships between other acknowledge information mentioned hereinafter. That is, in the embodiments of the present disclosure, the acknowledge information with respect to different information or signals may be the same, or may be different from each others.

At Step S1103, if the first module 100 receives the acknowledge information within a predetermined period since the sending of the second signal, the first module 100 sends a first signal to the second module 200 via the first interface 102. Else, the first module 100 issues error information in order to indicate that there is a fault in the communication lines, for example, there is a fault in the communication lines between the second interface 103 and the fourth interface 203 or the signal sent by the first interface 102 is unable to be turned to the second signal from the first signal. At this time, the first module 100 may further performing the proper processing as mentioned above.

At Step S1203, if the second module 200 receives the first signal via the third interface 202 within a predetermined period since the sending of the acknowledge information, the second module 200 sends new acknowledge information to the first module 100 via the fourth interface 203. Else, the second module 200 issues error information, in order to indicate that there is a fault in the communication lines, for example, there is a fault in the communication lines between the second interface 103 and the fourth interface 203 or the signal sent by the first interface 102 is unable to be turned to the first signal from the second signal. At this time, the second module 200 may further performing the proper processing as mentioned above. Furthermore, the second module 200 may send the error information to the first module 100 via the fourth interface 203.

At Step S1104, if the first module 100 receives the acknowledge information within a predetermined period since the sending of the first signal, the detection succeeds. Else, the first module 100 issues error information in order to indicate that there is a fault in the communication lines, for example, there is a fault in the communication lines between the second interface 103 and the fourth interface 203 or the signal sent by the first interface 102 is unable to be turned to the first signal from the second signal. At this time, the first module 100 may further performing the proper processing as mentioned above.

Figure 3:
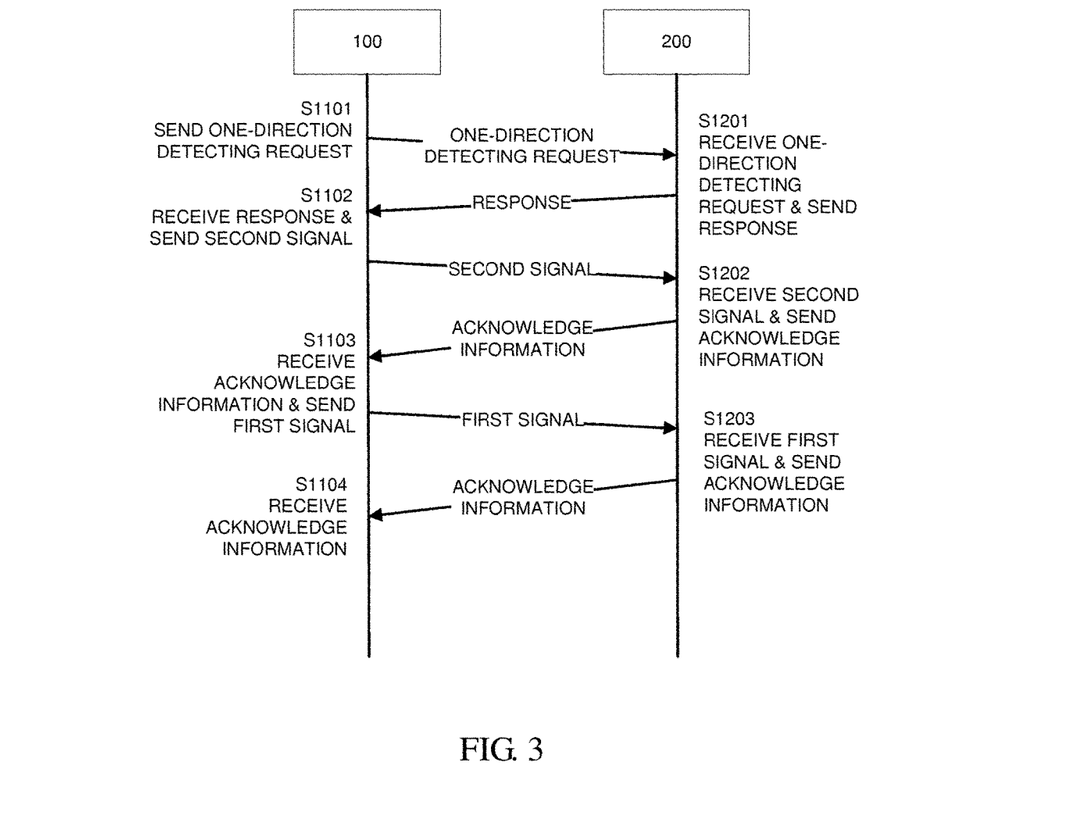
FIG. 3 is an illustrative diagram showing a one-direction interface detecting step according to an embodiment of the present disclosure.

The method shown in FIG. 3 is only an example of the one-direction interface detecting step. For example, it is also possible to firstly detect whether the second signal sent to the second module 200 by the first module 100 is able to be turned to the first signal, and then detect whether the first signal sent to the second module 200 by the first module 100 is able to be turned to the second signal, and it is also possible to detect whether the signal sent to the first module 100 by the second module 200 is able to be correctly received.

Moreover, the method shown in FIG. 2 may also include a bi-direction interface detecting step, in which whether the first signal and the second signal are able to be sent to the third interface 202 from the first interface 102 and whether the first signal and the second signal are able to be sent to the first interface 102 from the third interface 202 are detected.

Hereinafter, an example of the bi-direction interface detecting step will be described in combination with FIG. 4. Such step may be performed after the system 10 is started or after the switch of the first module 100 and the second module 200 is performed.

At Step S2101, the first module 100 sends a bi-direction detecting request to the second module 200 via the second interface 103.

At Step S2201, the second module 200 receives the bi-direction detecting request via the fourth interface 203, and if the second module 200 receives the first signal via the third interface 202 at this time, the second module 200 sends acknowledge information to the first module 100 via the fourth interface 203. Else, the second module 200 issues error information in order to indicate that there is a fault in the communication lines, for example, the first interface 102 is unable to send the first signal to the third interface 202. At this time, the second module 200 may further perform proper processing, for example, terminating the bi-direction interface detecting step and report to the operator. Furthermore, the second module 200 may send the error information to the first module 100 via the fourth interface 203. At Step S2201, the second module 200 may disable the switching of operation states on receiving the second signal via the third interface 202.

At Step S2102, if the first module 100 receives the acknowledge information via the second interface 103 within a predetermined period since the sending of the bi-direction detecting request, the first module 100 sends the second signal to the second module 200 via the first interface 102. Else, the first module 100 issues error information in order to indicate that there is a fault in the communication lines, for example, there is a fault in the communication lines between the second interface 103 and the fourth interface 203 or the first interface 102 is unable to send the first signal to the third interface 202. At this time, the first module 100 may further perform the proper processing as mentioned above.

At Step S2202, if the second module 200 receives the second signal via the third interface 202 within a predetermined period since the sending of the acknowledge information, the second module 200 sends new acknowledge information to the first module 100 via the fourth interface 203. Else, the second module 200 issues error information, in order to indicate that there is a fault in the communication lines, for example, there is a fault in the communication lines between the second interface 103 and the fourth interface 203 or the signal sent by the first interface 102 to the third interface 202 is unable to be turned to the second signal from the first signal. At this time, the second module 200 may further performing the proper processing as mentioned above. Furthermore, the second module 200 may send the error information to the first module 100 via the fourth interface 203.

At Step S2103, if the first module 100 receives the acknowledge information within a predetermined period since the sending of the second signal, the first module 100 sends a first signal to the second module 200 via the first interface 102. Else, the first module 100 issues error information in order to indicate that there is a fault in the communication lines, for example, there is a fault in the communication lines between the second interface 103 and the fourth interface 203 or the signal sent by the first interface 102 to the third interface 202 is unable to be turned to the second signal from the first signal. At this time, the first module 100 may further performing the proper processing as mentioned above.

At Step S2203, if the second module 200 receives the first signal via the third interface 202 within a predetermined period since the sending of last acknowledge information, the second module 200 sends new acknowledge information to the first module 100 via the fourth interface 203. Else, the second module 200 issues error information, in order to indicate that there is a fault in the communication lines, for example, there is a fault in the communication lines between the second interface 103 and the fourth interface 203 or the signal sent by the first interface 102 to the third interface 202 is unable to be turned to the first signal from the second signal. At this time, the second module 200 may further performing the proper processing as mentioned above. Furthermore, the second module 200 may send the error information to the first module 100 via the fourth interface 203.

At Step S2104, if the first module 100 receives the acknowledge information within a predetermined period since the sending of the first signal, the first module 100 sends a reverse request to the second module 200 via the second interface 103. Else, the first module 100 issues error information in order to indicate that there is a fault in the communication lines, for example, there is a fault in the communication lines between the second interface 103 and the fourth interface 203 or the signal sent by the first interface 102 to the third interface 202 is unable to be turned to the first signal from the second signal. At this time, the first module 100 may further performing the proper processing as mentioned above.

At Step S2204, if the second module 200 receives the reverse request via the fourth interface 203 within a predetermined period since the sending of last acknowledge information, the second module 200 switches the third interface 202 to send the first signal to the first module 100, and sends new acknowledge information to the first module 100 via the fourth interface 203. Else, the second module 200 issues error information, in order to indicate that there is a fault in the communication lines, for example, there is a fault in the communication lines between the second interface 103 and the fourth interface 203. At this time, the second module 200 may further performing the proper processing as mentioned above. Furthermore, the second module 200 may send the error information to the first module 100 via the fourth interface 203.

At Step S2105, if the first module 100 receives the acknowledge information via the second interface 103 within a predetermined period since the sending of the reverse request, the first module 100 switches the first interface 102 to receive signals from the second module 200, and the processing proceeds to Step S2106. Else, the first module 100 issues error information in order to indicate that there is a fault in the communication lines, for example, there is a fault in the communication lines between the second interface 103 and the fourth interface 203. At this time, the first module 100 may further performing the proper processing as mentioned above.

At Step S2106, if the first module 100 receives the first signal via the first interface 102 within a predetermined period since the sending of the reverse request, the first module 100 sends acknowledge information to the second module 200 via the second interface 103. Else, the first module 100 issues error information in order to indicate that there is a fault in the communication lines, for example, there is a fault in the communication lines between the second interface 103 and the fourth interface 203 or the third interface 202 is unable to send the first signal to the first interface 102. At this time, the first module 100 may further performing the proper processing as mentioned above.

At Step S2205, if the second module 200 receives the acknowledge information via the fourth interface 203 within a predetermined period since the sending of first signal, the second module 200 sends the second signal to the first module 100 via the third interface 202. Else, the second module 200 issues error information, in order to indicate that there is a fault in the communication lines, for example, there is a fault in the communication lines between the second interface 103 and the fourth interface 203 or the third interface 202 is unable to send the first signal to the first interface 102. At this time, the second module 200 may further performing the proper processing as mentioned above. Furthermore, the second module 200 may send the error information to the first module 100 via the fourth interface 203.

At Step S2107, if the first module 100 receives the second signal via the first interface 102 within a predetermined period since the sending of the acknowledge information, the first module 100 sends new acknowledge information to the second module 200 via the second interface 103. Else, the first module 100 issues error information in order to indicate that there is a fault in the communication lines, for example, there is a fault in the communication lines between the second interface 103 and the fourth interface 203 or the first signal sent by the third interface 202 to the first interface 102 is unable to be turned to the second signal. At this time, the first module 100 may further performing the proper processing as mentioned above.

At Step S2206, if the second module 200 receives the acknowledge information via the fourth interface 203 within a predetermined period since the sending of first signal, the detection succeeds. Else, the second module 200 issues error information, in order to indicate that there is a fault in the communication lines, for example, there is a fault in the communication lines between the second interface 103 and the fourth interface 203 or the first signal sent by the third interface 202 to the first interface 102 is unable to be turned to the second signal. At this time, the second module 200 may further performing the proper processing as mentioned above. Furthermore, the second module 200 may send the error information to the first module 100 via the fourth interface 203.

Figure 4:
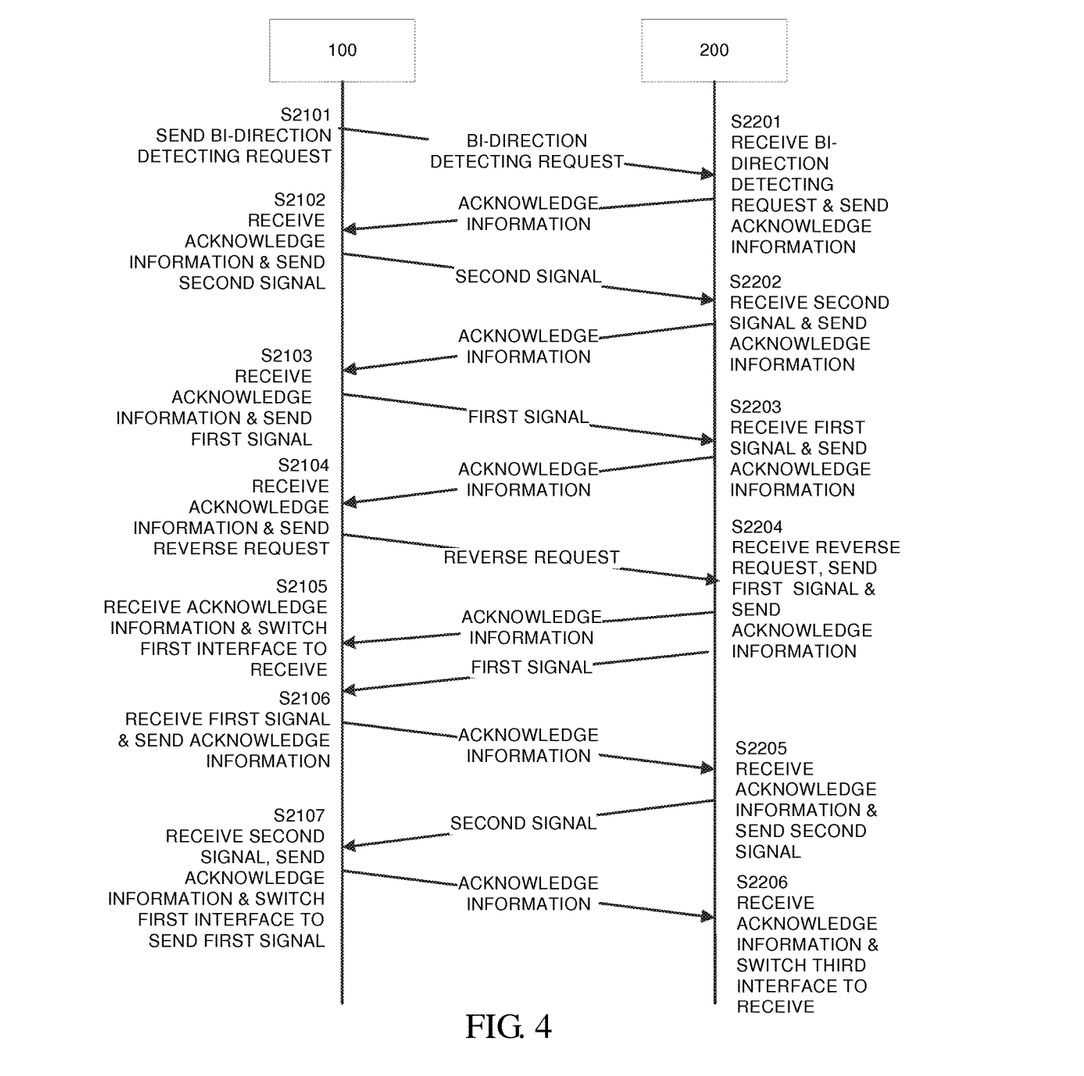
FIG. 4 is an illustrative diagram showing a bi-direction interface detecting step according to an embodiment of the present disclosure.

The method shown in FIG. 4 is only an example of the bi-direction interface detecting step. For example, it is also possible to firstly detect whether the second signal sent to the third interface 202 by the first interface 102 is able to be turned to the first signal correctly, and then detect whether the first signal sent to the third interface 202 by the first interface 102 is able to be turned to the second signal, and it is also possible to firstly detect whether the signal sent to the first interface 102 by the third interface 202 is able to be received correctly, and then detect whether the signal sent to the third interface 202 from the first interface 102 is able to be received correctly.

Moreover, the method shown in FIG. 2 may also include a synchronization step, for the first module 100 and the second module 200 to know the state of each other, so as to determine whether to switch or not.

In the synchronization step, the first module 100 periodically sends a first operation state information about the operation state of the first module 100 to the second module 200 via the second interface 103, and the second module 200 periodically sends a second operation state information about the operation state of the second module 200 to the first module 100 via the fourth interface 203.

Above period may be 50 ms for example. Furthermore, the first module 100 may detect whether the second state information from the second module 200 as the response is received within a predetermined period since the sending of the first state information. If the first module 100 fails to receive the response, the first module 100 may perform proper processing, for example, reporting synchronization error to the operator. Similarly, the second module 200 may also detect whether the first state information from the first module 100 as the response is received within a predetermined period since the sending of the second state information. If the second module 200 fails to receive the response, the second module 200 may perform proper processing, for example, reporting synchronization error to the operator.

Based on above one-direction interface detecting step, bi-direction interface detecting step and the synchronization step, whether there is any fault in the communication lines between the modules may be better judged, and thus the reliability in switching process will be improved.

Although the preferable embodiments of the present disclosure have been shown and described, those ordinary skilled in the art should appreciate, the embodiments and the features thereof may be amended, replaced and combined in various way, which are intended to fall into the scope of protection defined by the claims of the present disclosure.

The invention claimed is:

1. A module which has switchable operation states, comprising:
   a first switching unit, configured to switch the module between a first operation state and a second operation state;
   a first interface, configured to be switched between sending signals to another module which has switchable operation states and receiving signals from the other module, wherein the first interface sends a first signal to the other module when the module is in the first operation state, sends a second signal to the other module when the module is to be switched into the second operation state, and receives signals from the other module when the module is in the second operation state; and
   a second interface, configured to communicate with the other module, wherein:
   when the second interface receives, from the other module, a response to the second signal sent by the first interface, the first switching unit switches the module into the second operation state.

2. The module according to claim 1, wherein:
   if the second interface fails to receive the response within a predetermined period, the module issues error information.

3. The module according to claim 1, wherein:
   the first operation state is a normal operation state, and the second operation state is a backup state.

4. The module according to claim 3, wherein:
   the first interface is connected to the other module by a single cable, and
   the first signal is of high level and the second signal is of low level.

5. The module according to claim 4, wherein:
   the second interface is a Serial Communication Interface (SCI).

6. The module according to claim 1, wherein the module is a module with at least one of the following functions: measuring field data and controlling a field device in process control.

* * * * *